United States Patent
Lee et al.

(10) Patent No.: US 11,961,199 B2
(45) Date of Patent: Apr. 16, 2024

(54) METHOD AND APPARATUS FOR PARTIAL SIMULATION OF PINCHING TO FORM WRINKLES ON A GARMENT

(71) Applicant: CLO Virtual Fashion Inc., Seoul (KR)

(72) Inventors: Yong Joon Lee, Seoul (KR); In Ho Park, Seoul (KR)

(73) Assignee: CLO Virtual Fashion Inc., Seoul (KR)

(*) Notice: Subject to any disclaimer, the term of this patent is extended or adjusted under 35 U.S.C. 154(b) by 0 days.

(21) Appl. No.: 17/479,593

(22) Filed: Sep. 20, 2021

(65) Prior Publication Data

US 2022/0092865 A1 Mar. 24, 2022

(30) Foreign Application Priority Data

Sep. 22, 2020 (KR) .................. 10-2020-0122510

(51) Int. Cl.
*G06T 19/20* (2011.01)
*G06T 17/10* (2006.01)

(52) U.S. Cl.
CPC .............. *G06T 19/20* (2013.01); *G06T 17/10* (2013.01); *G06T 2210/16* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 9,659,396 B1 | 5/2017 | Chang et al. | |
| 2015/0054714 A1* | 2/2015 | Haubner | G09B 9/00 345/1.3 |
| 2017/0161948 A1* | 6/2017 | Hua | A41H 1/02 |
| 2018/0300959 A1* | 10/2018 | Souza | G06T 17/20 |
| 2018/0315253 A1* | 11/2018 | Grant | G06T 19/20 |
| 2019/0244407 A1* | 8/2019 | Wiesel | G06T 11/00 |
| 2022/0215631 A1* | 7/2022 | Hauswiesner | G06T 17/20 |

FOREIGN PATENT DOCUMENTS

| | | |
|---|---|---|
| JP | 2010-271820 A | 12/2010 |
| KR | 10-1702069 B1 | 2/2017 |
| KR | 10-2017-0095667 A | 8/2017 |

(Continued)

OTHER PUBLICATIONS

Naver Blog Post, "[Fashion : 3D CLO] Fashion CLO Chapter 15—drawing shirring & pleats onepiece" Jun. 19, 2019, pp. 1-23, [Online] [Retrieved on Dec. 20, 2021], Retrieved from the Internet <URL: https://blog.naver.com/PostPrint.naver?blogId=lovelyjoi&logNo=221566023930>.

(Continued)

*Primary Examiner* — Kent W Chang
*Assistant Examiner* — Jonathan M Cofino
(74) *Attorney, Agent, or Firm* — WTA Patents (57) ABSTRACT

Partial simulation of forming wrinkles on a garment is performed by receiving selection of a partial region of a three-dimensional (3D) model of a garment that includes an a first region and a second region. The outer coordinates of polygons in the periphery of the selected first region are fixed while polygons in the second region within the first region are moved to simulate wrinkles formed in a middle region between the first region and the second region based on an external force applied to the second region.

18 Claims, 6 Drawing Sheets

(56) References Cited

FOREIGN PATENT DOCUMENTS

| KR | 10-1763361 B1 | 8/2017 |
| KR | 10-2019-0028634 A | 3/2019 |
| WO | WO 2013/123306 A1 | 8/2013 |
| WO | WO 2020/131518 A1 | 6/2020 |

OTHER PUBLICATIONS

Youtube Video, "23 03 Deformation of the Garment Rearranging Patterns With", Dec. 18, 2017, two pages, [Online] [Retrieved on Dec. 20, 2021] Retrieved from the Internet <URL: https://www.youtube.com/watch?v=WnGNwX8WG44> times 00:10-00:30.

* cited by examiner

METHOD AND APPARATUS FOR PARTIAL SIMULATION OF PINCHING TO FORM WRINKLES ON A GARMENT

CROSS-REFERENCE TO RELATED APPLICATION

This application claims the benefit of Korean Patent Application No. 10-2020-0122510, filed on Sep. 22, 2020, in the Korean Intellectual Property Office, the disclosure of which is incorporated herein by reference.

BACKGROUND

1. Field of the Invention

Embodiments relate performing partial simulating forming of wrinkles on a region of a garment draped on an avatar.

2. Description of the Related Art

A garment appears in three dimensions when worn on a person's body, but it is more in two dimensions because it is actually a combination of pieces of fabric cut according to a two-dimensional (2D) pattern. Because fabric is flexible, it may vary in shape according to the shape of a person's body or motion of the person who wears the garment. In general, simulation of all pattern pieces of a garment is performed to express realistic wrinkles in the garment. For example, expressing wrinkles in a garment having many details involves much processing and time and is inefficient.

SUMMARY

Embodiments relate to simulating wrinkles in a region of a garment in an efficient manner. Selection of a first region of a three-dimensional (3D) model of a garment is received. Wrinkles in the garment are to be simulated in the first region of the 3D model. Positions of polygons of the 3D model in the periphery of the selected region is fixed after receiving the selection. An input indicating moving of a second region of the 3D model is received. The second region is located within the first region. Formation of wrinkles within the first region and outside the second region of the garment is simulated by at least applying an external force corresponding to the moving of the second region after receiving the input.

In one or more embodiments, a number of layers in the first region to be simulated with the wrinkles is received. The the garment in the first region includes a plurality of layers.

In one or more embodiments, the number of layers indicates a number of outermost layers to be simulated with the wrinkles.

In one or more embodiments, a thickness of the first region is received. The number of layers of the garment in the first region for simulating the wrinkles corresponding to the received thickness is determined based on the thickness.

In one or more embodiments, polygons of the 3D model at the periphery of the first region are identified. Coordinates of the identified polygons relative to coordinates of polygons of the 3D model adjacent to and outside the first region are fixed.

In one or more embodiments, the formation of the wrinkles is simulated by applying the external force to polygons within the first region but outside the second region.

In one or more embodiments, the formation of the wrinkles is simulated by simulating pinching of a polygon in the second region and a polygon outside the second region but inside the first region.

In one or more embodiments, the formation of the wrinkles is simulated by sequentially propagating force exerted by pinching to polygons neighboring the polygon outside the second region but inside the first region.

In one or more embodiments, the external force increases as moving of the second region increases, and the wrinkles extend in a direction tangential to a direction of the input.

In one or more embodiments, configurations and positions of polygons of the 3D model outside the first region remain unchanged during simulating of the formation of the wrinkles.

In one or more embodiments, configurations of polygons within the second region and relative positions of the polygons within the second region remain unchanged during simulating of the formation of the wrinkles.

In one or more embodiments, the selection of the first region is received as through a graphical user interface.

In one or more embodiments, the input indicating the moving of the second region is a drag operation performed by a user on a graphical user interface.

In one or more embodiments, when the drag operation is released, the simulation to previous state without the wrinkles.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

A 3D model of a garment may be formed by a mesh including polygons. For example, the vertices of a polygon included in the mesh may be point masses, and the sides of the polygon may be represented as elastic springs which connect the point masses. The 3D model of the garment may be modeled by a mass-spring model, for example. The springs may have respective resistance values against, for example, stretch, shear, and bending, depending on a material property of fabric used. Alternatively, the mesh may be modeled by a strain model. A polygon included in the mesh may be modeled, for example, as a triangle or as a polygon having four or more sides. In some examples, in case of needing to model a 3D volume, the mesh may be modeled as a 3D polyhedron.

The vertices of the polygons included in the mesh may be moved by an external force such as gravity and an internal force such as stretch, shear, and bending. If a force applied to each vertex is determined by calculating the external force and the internal force, the velocity of displacement and movement of each vertex may be determined. Movements of the garment may be simulated in multiple time steps by determining movements of the vertices of the polygons in the mesh in each time step. For example, when a garment defined by a polygonal mesh is draped over a 3D avatar, natural appearance and movement of a 3D garment based on the law of physics may be exhibited. The vertices of the polygons included in the mesh may move according to external forces such as gravity and internal forces such as stress, compression and shearing. Forces applied to each vertex may be determined by computing the external force and the internal force applied to the polygon. In turn, the velocity and displacement of each vertex may be computed by taking into account the applied forces. Also, by simulating movements of the vertices of the polygons of the mesh across multiple time steps, the movement of the entire virtual garment may also be simulated. When a two-dimensional (2D) pattern formed of a polygonal mesh is draped over a 3D avatar, a 3D model of a garment may enable simulation of the configuration and movement of the garment in a natural manner based on the law of physics.

Figure 1:
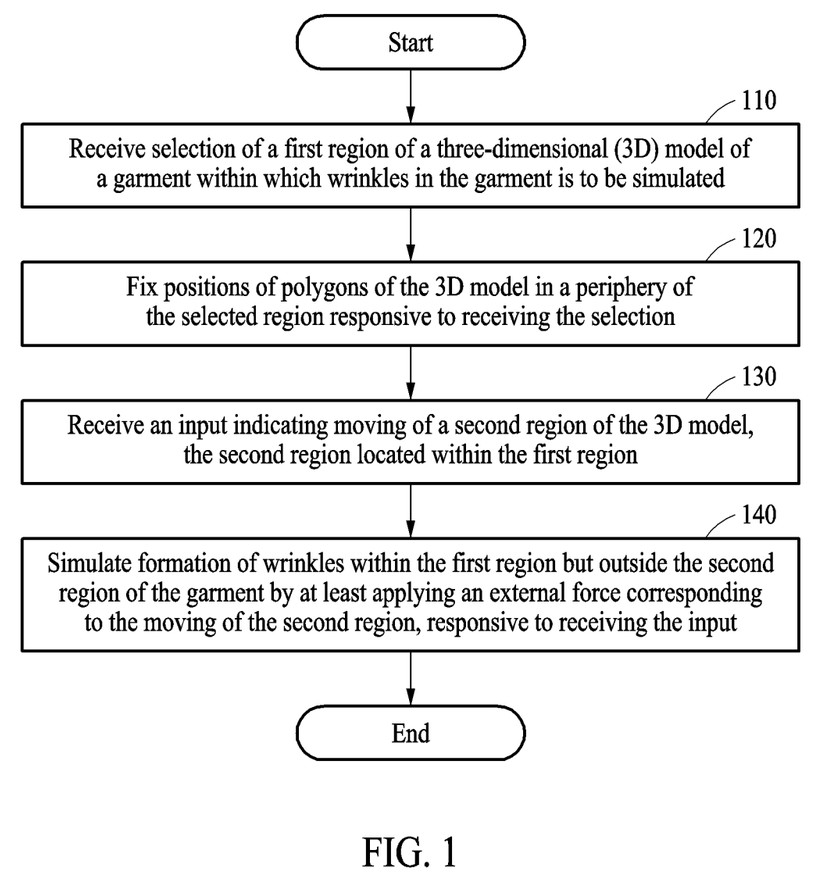
FIG. 1 is a flowchart illustrating a process of performing simulation to display wrinkles on a garment, according to an example embodiment.

Figure (FIG. 1 is a flowchart illustrating a method of performing simulation to display wrinkles in a garment, according to an example embodiment. Selection of a first region of a 3D model of a garment may be received 110 from a user via a first user interface (UI). The selection of the first region may be performed, for example, using a graphical user interface involving a graphical element of a brush with a predetermined thickness. The first region of the 3D model of the garment identified by a user using such graphical user interface is described below in detail with reference to FIG. 2.

Figure 3A:
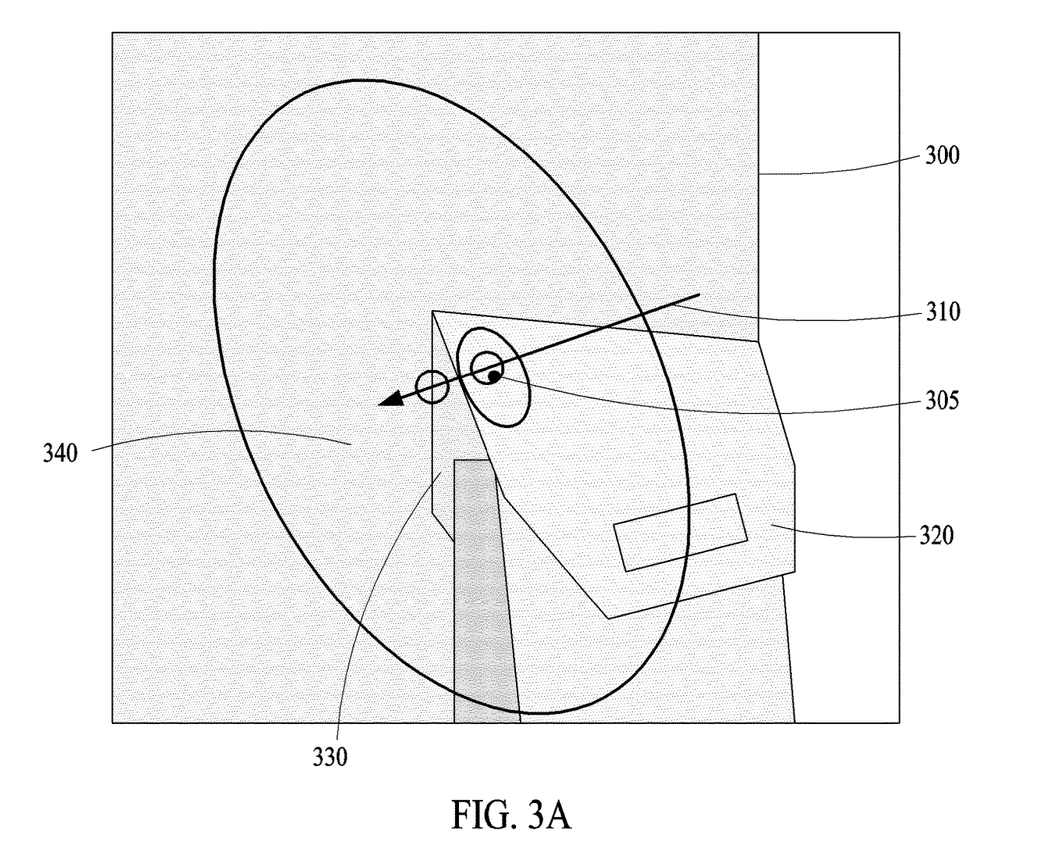
FIG. 3A is a diagram illustrating selection of a region in a 3D model of a garment with multiple layers, according to an example embodiment.
Figure 3B:
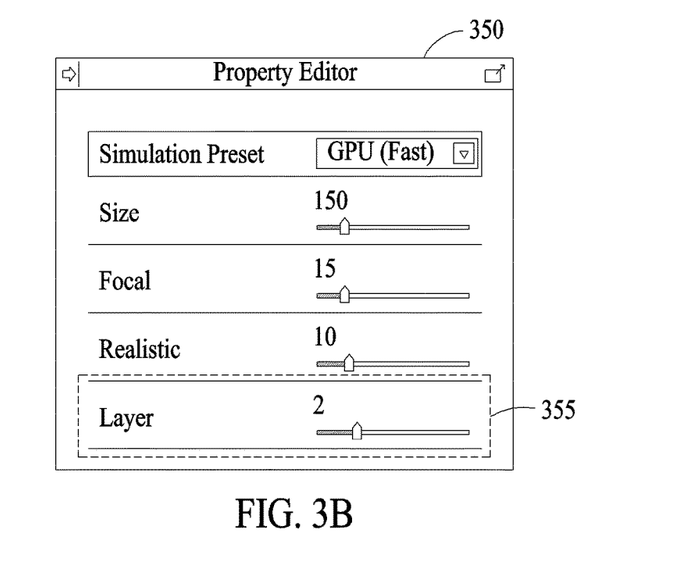
FIG. 3B is a diagram of a graphical user interface for receiving a number of layers for simulating the wrinkles, according to an example embodiment.

If the selected region includes layers of pattern pieces constituting the 3D model of the garment, the number of layers for simulating the wrinkles may also be received. The pattern pieces may be 2D patterns of the garment for each body part. The 2D pattern may be a virtual 2D pattern that is modeled as a set of triangles for simulating the 3D model of the garment. The 2D pattern includes pattern pieces, and each of the pattern pieces may be modeled, for example, as a polygonal mesh based on the body shape of the 3D avatar. In this case, the polygonal mesh may include polygons. The process of receiving a selection of the partial region when the 3D model of the garment is configured with multiple layers is described below with reference to FIG. 3.

To perform the simulation of wrinkles in the selected region, positions of polygons in the 3D model in the periphery of the region is fixed 120. Specifically, polygons of the mesh at the outermost points of the selected region is identified. The partial simulation apparatus may fix coordinates of the polygons of the mesh corresponding to the outermost points to coordinates of polygons of the mesh at the periphery of the selected region, for example. The example of fixing the external figure to the peripheral region of the selected region is described further below with reference to FIG. 4.

A second region within the first region is moved 130, for example, using a graphical user interface. The configuration and relative positions of polygons in the second region may be maintained without deformation, and only the position of the second region may be updated. The process of moving the second region within the first region is described further below with reference to FIG. 5.

Forming of wrinkles in a middle region between the first region and the second region based on an external force according to the movement of the internal figure is simulated 140. Specifically, the wrinkles formed in the middle region for selected layers in the selected region, based on the external force. For example, the partial simulation apparatus may simulate the wrinkles formed in the middle region for a layer corresponding to a pattern piece sewed together with layers of the selected number corresponding to the selected partial region, based on the external force. The simulation of wrinkles in the middle region may be performed by applying the external force according to the movement of the second region to polygons in the middle region, for example. The example of simulating the wrinkles is described described further below with reference to FIGS. 6A through 6D.

Figure 2:
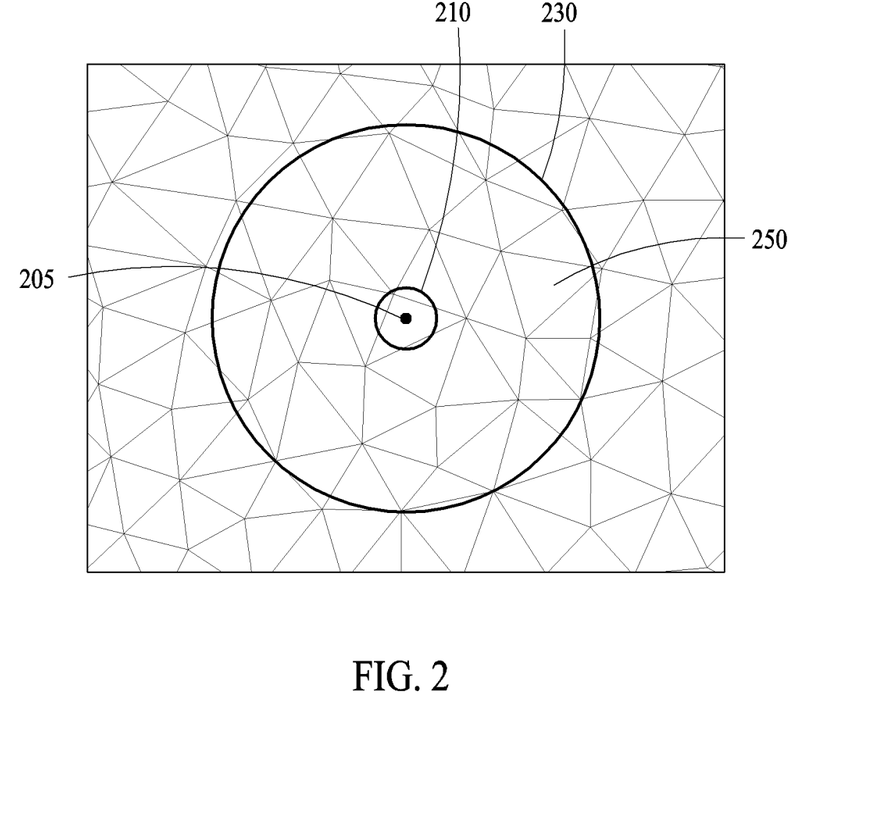
FIG. 2 is a conceptual diagram illustrating a region of a three-dimensional (3D) model of a garment selected for simulating wrinkles, according to an example embodiment.

FIG. 2 illustrates a first selected region of a 3D model of a garment defined by circle 230, according to an example embodiment. A second region is defined by smaller circuit 210. A user may select the first region be expressed with wrinkles using a first UI element in the shape of a brush. When the user selects the first region in which wrinkles are to be expressed by the 3D model of the garment through a drag using the first UI element, the simulation apparatus may express wrinkles in the first region. The first region defined by circle 230, au be set by the outermost line touched by the brush based on a center 205 of the second region of the 3D model of the garment. In addition, the second region defined by circle 210 may be set to with a radius of a predetermined distance from the center 205 at which a mouse is clicked.

The circle 230 is for setting the first region in which wrinkles are to be simulated. In addition, the circle 210 is for setting the second region which is to move relative to the first region to cause an external force that results in pinching in the garment. In the simulation process, wrinkles are formed in a middle region 250 between the circle 210 and the circle 230, but not in the circle 210. The second region defined by circle 210 may be maintained without a change even during the simulation of forming wrinkles in the middle region 250.

FIG. 3A is a diagram illustrating selection of a region with multiple layers, according to an example embodiment. The garment includes multiple layers 320, 330, and 340. Referring to FIG. 3A, a ray 310 radiated to the center 305 of a selected partial region in a 3D model 300 of the garment. FIG. 3B is a user interface diagram illustrating a property editor for receiving a selection of the number of layers for simulating wrinkles from among the multiple layers 320, 330, and 340 are shown. Simulation preset is an option to select a simulation type (i.e., CPU, GPU, sophisticated but fast, slow but sophisticated, etc.). Size is the diameter value of the circle outside the selection area, and Focal is the diameter value of the circle inside the selection area. The focal region is not simulated and moves as if holding the part by hand. Realistic is an option to set the number of simulations to set realistic expression as a value. A higher Realistic value makes it more realistic. For example, if the Realistic value is set to 10, it means that there are 10 simulation calculations per tick. Layer is an option that determines how many layers to simulate when clothes are overlapped.

For example, a user may select a first region including the multiple layers 320, 330, and 340 in the 3D model 300 of the garment to form wrinkles. In this case, the multiple layers 320, 330, and 340 may correspond to, for example, pattern pieces constituting the garment. For example, the layer 320 may correspond to a pattern piece of a pocket cover, the layer 330 may correspond to a pattern piece of a pocket, and the layer 340 may correspond to a pattern piece of the front of a top to which the pocket cover and the pocket are attached.

Alternatively, the multiple layers 320, 330, and 340 may correspond to multiple cloth layers.

If the region selected in a circular shape includes layers corresponding to the pattern pieces constituting the 3D model of the garment as shown in FIG. 3A, simulation results may be unnatural unless the multiple layers are simulated together. For example, if wrinkles are simulated only in the outermost pattern piece that is sewed with other inner pattern pieces, the simulation may result in floating of the outermost pattern piece in the air without support of inner pattern pieces.

FIG. 3B illustrates a property editor that enables the user to select the number of layers for simulating wrinkles through the UI screen 350. Based on the number of layers received through the UI 355, the partial simulation apparatus may simulate wrinkles in layers according to the received number. In this case, the layers 320, 330, and 340 may be assigned indices, wherein the indices may be sequentially assigned to the layers so that a layer closer to the center 305 of the selected region is given a lower index. For example, the outermost layer 320 may be assigned index 1, the middle layer 330 may be assigned index 2, and the innermost layer 340 may be assigned index 3.

If the user selects "2" as the number of layers for simulating wrinkles through the UI 355, wrinkles for the layer 320 having the index 1 and the layer 330 having the index 2 in the partial region may be selected for simulating wrinkles. Wrinkles may then be simulated in the middle region by reflecting a sewing state to a layer corresponding to a pattern piece sewed together with layers of the selected number corresponding to the selected region.

In some example embodiments, the simulation apparatus may automatically calculate the number of layers for simulating wrinkles based on a thickness set by the user. For example, the partial simulation apparatus may obtain the set thickness corresponding to the partial region selected by the user. The partial simulation apparatus may calculate the number of layers for simulating wrinkles in the partial region of the 3D model of the garment based on the set thickness, and simulate wrinkles in the pattern pieces corresponding to the calculated number of layers.

Figure 4:
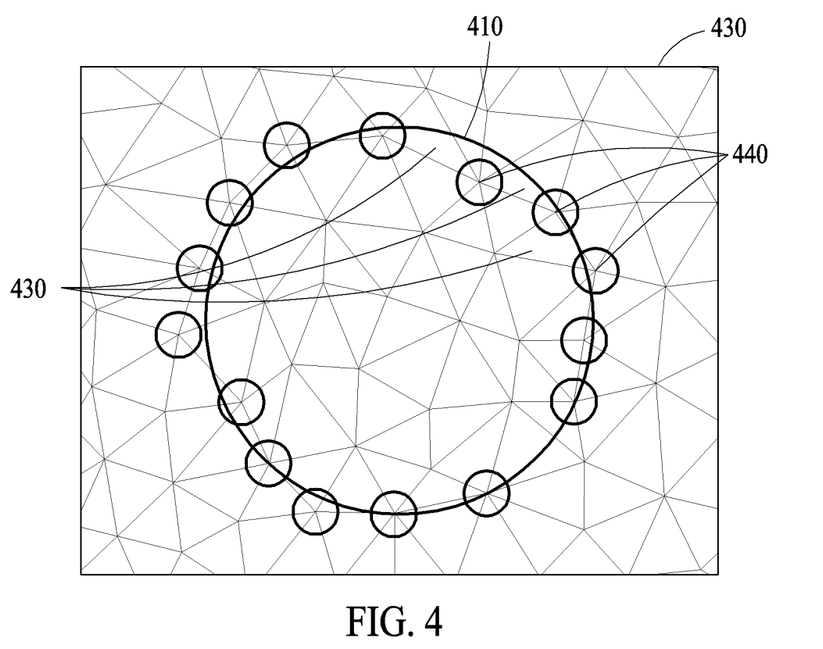
FIG. 4 is a conceptual diagram illustrating fixing polygons at a peripheral of the selected region, according to an example embodiment.

FIG. 4 is a conceptual diagram illustrating fixing of the selected first region to its periphery, according to an example embodiment. Referring to FIG. 4, circle 410 defining the selected first region and vertices 440 of polygons 430 of a mesh at the periphery of the circle 410 are shown. The wrinkles of the selected region are simulated independently, and the region may be affected by an external force, such as being rotated or blown by an external effect such as wind or gravity. Because the selected region corresponds to a portion of a pattern piece of the 3D model of the garment, wrinkles are simulated while the shape and configurations of regions outside the selected region are maintained. Therefore, the simulation apparatus may search for outermost points in the selected region and fix the outermost points to the peripheral region, thereby simulating wrinkles of the pattern piece in a natural manner.

For example, the partial simulation apparatus may search for the polygons 430 of the mesh corresponding to the outermost points of the external FIG. 410. In this case, the polygons 430 of the mesh may correspond to polygons including the outermost points of the external figure or polygons nearest to the outermost points.

The partial simulation apparatus may fix coordinates of the polygons 430 of the mesh corresponding to the outermost points, in more detail, coordinates of the vertices 440 of the polygons 430, to coordinates of polygons of the mesh corresponding to the peripheral region of the selected region.

Figure 5:
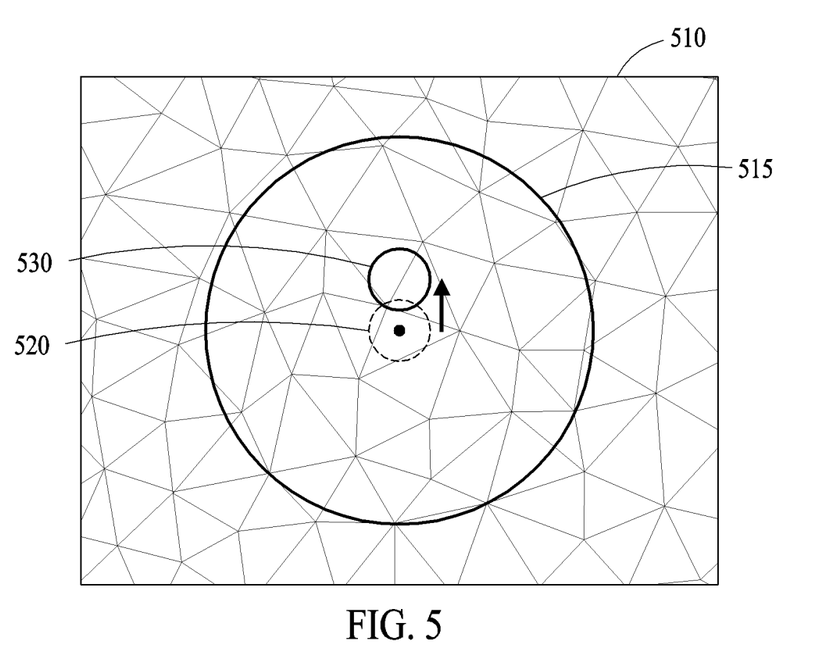
FIG. 5 is a conceptual diagram illustrating moving of an internal region within the selected region, according to an example embodiment.

FIG. 5 is a diagram illustrating the process of moving the second region within a first region, according to an example embodiment. Referring to FIG. 5, a 3D model 510 of a garment, a region 515 selected in the 3D model of the garment, and a region 520 moved to a region 530 are shown. Although the 3D model 510 of the garment is simply represented for ease of description, the 3D model of the garment may be represented in various other designs. A simulation apparatus may perform partial simulation on the region 515 selected in the 3D model 510 of the garment, rather than simulating the entire 3D model 510 of the garment to form wrinkles in the 3D model 510 of the garment. The position of the selected region 515 may be fixed through a user input such as a mouse click. For example, the position may be fixed by moving the circle 520 representing the second region to a position indicated by circle 530. The moving indicates pulling up of the second region that acts as an external force applied to the second region.

The partial simulation apparatus may express wrinkles by twisting a middle region between the fixed position of the first region 515 and the second region 530. The example of simulating wrinkles by the partial simulation apparatus is described below with reference to FIG. 6.

Figure 6A:
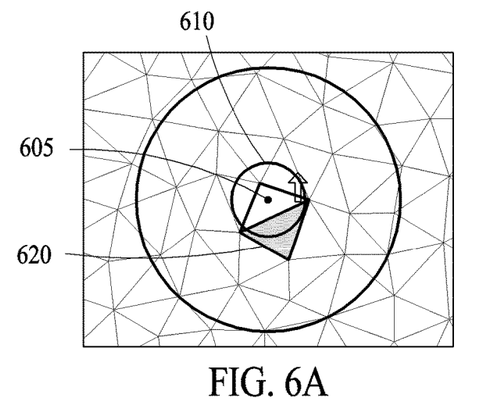
FIGS. 6A through 6D are diagrams illustrating simulating wrinkles formed in a middle region according to an example embodiment.
Figure 6B:
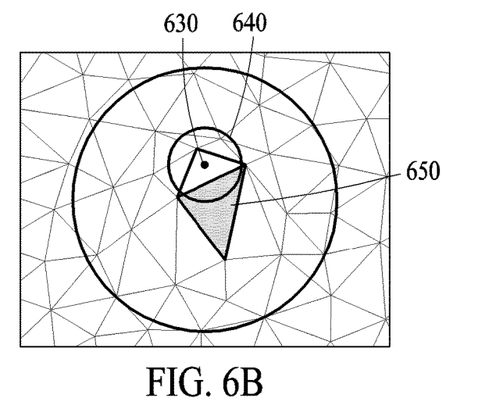
Figure 6C:
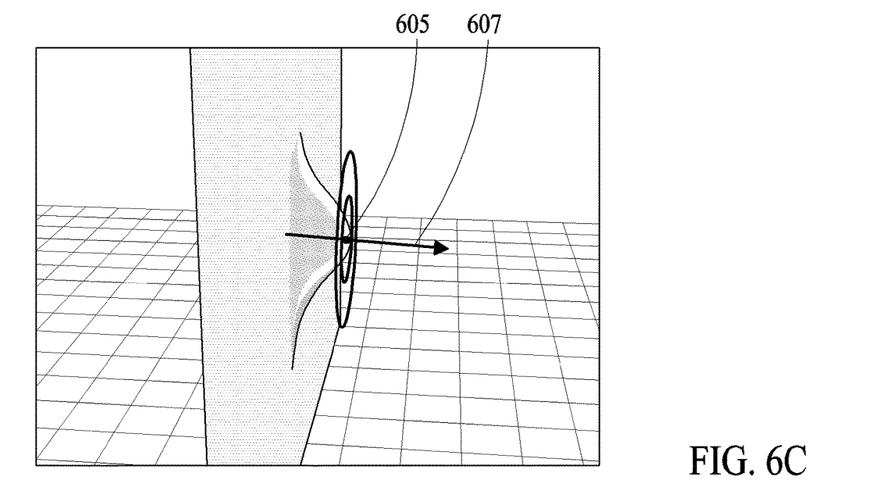
Figure 6D:
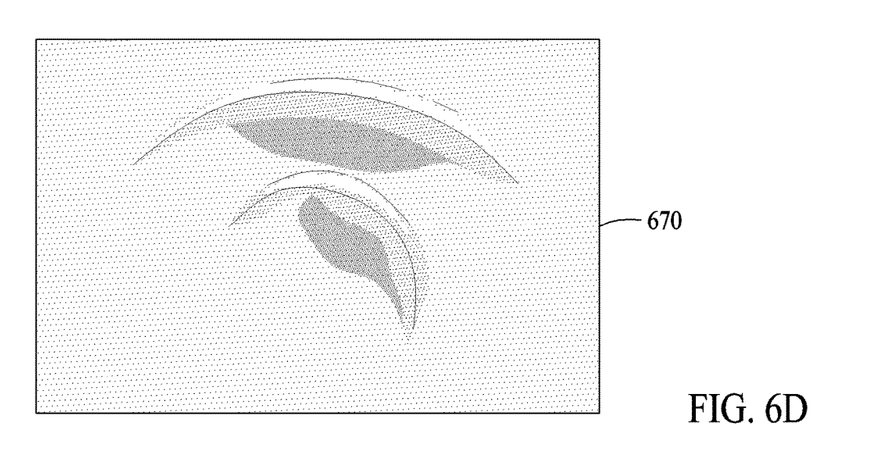

FIGS. 6A and 6B are diagrams illustrating the process of simulating wrinkles formed in a middle region, according to an example embodiment. FIG. 6D illustrates a result screen 670 displaying the result of simulating wrinkles formed as a user's input indicates moving of a second region originally in the position indicated by circle 610 of FIG. 6A to another position indicated by circle 640 in FIG. 6B. The second region 610 may be set when the user points a center 605 through a UI element provided in the shape of a brush, and the second region 640 may have a center 630.

When a selected region is selected through a user input received through the UI element in the form of a brush, a partial simulation apparatus may simulate only a region (for example, a donut-shaped region) between the inner circle 610 and the outer circle. The partial simulation apparatus may maintain the existing simulation result of the remaining region except for the donut-shaped region in the garment. The existing simulation result may be obtained as a result of a simulation performed (before performing partial simulation on wrinkles) and includes, for example, a sewing state or a draping state. The existing simulation result of the remaining region may be remain in a frozen state and not updated during the partial simulation operation of the wrinkles.

As the distance between the circles 610 and 640 increases, the deformation and the resulting external/internal force applied to the donut-shaped middle region increases. Conversely, if the distance between the circles 640 and 640 decreases, the deformation and the resulting external/internal force applied to the donut-shaped middle region decreases.

The attributes of the second region (represented by circles 610, 640) may be set by options of a UI element in the shape of a brush. For example, the shape or size of the second region may be set as options by the user. The position of the outer circle indicating the first region may be fixed through a click or double-click motion of a mouse by the user. For example, when the mouse is clicked and dragged upward, the partial simulation apparatus may move the circle 610 upward to the circle 640 while fixing the shape and configuration of the polygons in the circle 610. When the user moves the circle 610 of FIG. 6A to the position of the circle 640 of FIG. 6B, polygons (e.g., polygon 620) adjacent to the circle 610 or 640 may stretch as shown in FIG. 6B. In this case, a compressive force acts on the stretched polygon 650 as an internal force. The compressive force of the stretched polygons (e.g., polygon 620) may propagate to other polygons adjacent to the stretched polygons in the middle region.

The simulation apparatus may sequentially propagate the internal force due to deformation of polygons in the middle region, thereby simulating forming of wrinkles in the middle region. The wrinkles may be formed by simulating pinching of the garment where one region of pinching is the second region. The external force applied to simulate pinching may be propagated to polygons in the middle region as internal force, thereby forming wrinkles formed in the middle region.

In order to express wrinkles in the 3D model of the garment, it is effective to simulate wrinkles as if the second region was pushed up as shown in the result screen 670 of FIG. 6D. As shown in FIG. 6C, if the pinching of the second region is simulated by pulling the center 605 of the selected region in a direction normal to the surface of the 3D model as shown by arrow 607, the pinched portion may come convex, which may lead to unrealistic or undesirable simulation. That is, deformation of the second region in the normal direction may not be effective in simulating wrinkles.

Hence, the simulation apparatus may restrict the deformation of the second region in the direction indicated by arrow 607 at the center 605 in the second region, and instead, allow the direction of an external force indicated by the user input to be tangential to the surface of the 3D model. Even when a user input indicates a component that is normal to the 3D surface, the simulation apparatus may exclude such component, and take into account allow only the components of the force that are perpendicular to the normal direction of the wrinkles (i.e., the tangential direction for the wrinkles).

Simulation of the wrinkles, as described above, may be performed temporarily while the user is dragging the mouse and cancel the simulation of the wrinkles when mouse button is released. In this case, as the user suspends the dragging operation of the mouse, the simulation apparatus may remove the simulated wrinkles at that position and initialize relevant data. In some example embodiments, when the simulation of the wrinkles is canceled, the simulation apparatus may revert to the simulation state before performing the simulation of wrinkling. Alternatively, the simulation apparatus may maintain wrinkles even after the mouse button is released.

Figure 7:
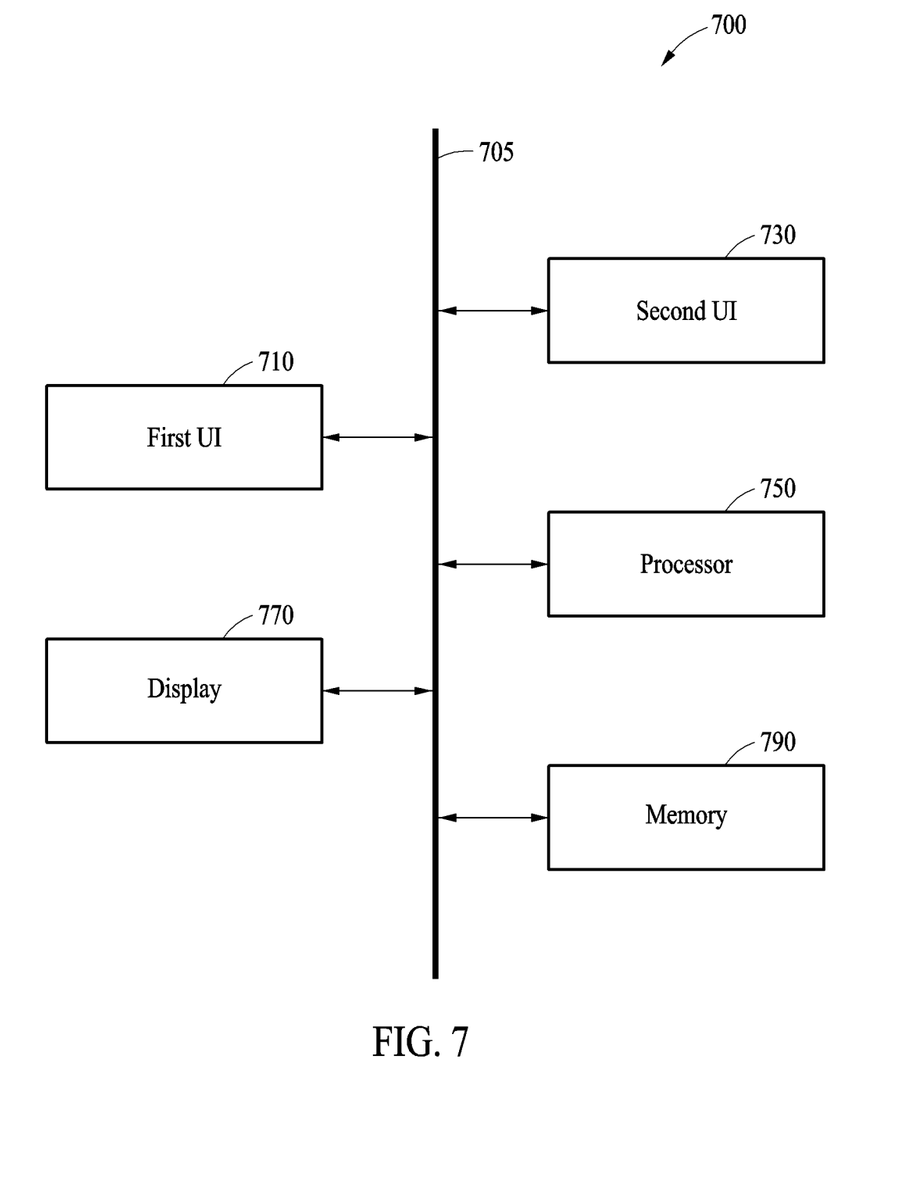
FIG. 7 is a block diagram illustrating a computing apparatus for performing simulation of the garment with wrinkles, according to an example embodiment.

FIG. 7 is a block diagram illustrating a computing device 700 implementing the simulation apparatus, according to an example embodiment. Referring to FIG. 7, the simulation apparatus 700 may include, among other components, a first UI device 710, a second UI device 730, a processor 750, a display device 770, and a memory 790. The first UI device 710, the second UI device 730, the processor 750, the display device 770, and the memory 790 may communicate with each other through a communication bus 705.

The first UI device 710 may receive, if a partial region selected by a user includes layers corresponding to pattern pieces constituting the 3D model of the garment, a selection of the number of layers for simulating wrinkles from among the layers. In this case, the layers may be assigned indices, wherein the indices are sequentially assigned to the layers corresponding to the pattern pieces that collide with a ray radiated to the center of the selected partial region in an order of layers closer to the ray. The second UI device 730 may be used to define the second region.

The processor 750 fixes the external figure to a peripheral region of the selected partial region. The processor 750 moves the internal figure within a second region of the first region using the second UI device 730. The processor 750 simulates wrinkles formed in a middle region between the first region and the second region based on an external force according to the movement of the second region.

The processor 750 may simulate the wrinkles formed in the middle region for layers of the selected number corresponding to the selected partial region, based on the external force.

The processor 750 may form the wrinkles by simulating pinching of the garment, in the direction the external force is applied. The processor 750 may sequentially propagate the external force to polygons adjacent to the polygon of the pinched polygons in the middle region, thereby simulating the wrinkles formed in the middle region.

The processor 750 may search for polygons of a mesh corresponding to outermost points of the external figure. The processor 750 may fix coordinates of the polygons of the mesh corresponding to the outermost points to coordinates of polygons of the mesh corresponding to the peripheral region of the selected partial region.

The display device 770 displays the wrinkles simulated through the processor 750.

The memory 790 may store information on a partial region of a virtual garment received through the first UI device 710. The information on a partial region may include, for example, position coordinates, a tag or index of a garment pattern at a position corresponding to the partial region, or the like. However, the example embodiments are not necessarily limited thereto. The memory 790 may store information related to the position to which the internal figure is moved through the second UI 730. The information related to the position of the internal figure may include position coordinates of the internal figure, indices of polygons of a mesh constituting a garment pattern where the internal figure is positioned, or the like. However, the example embodiments are not necessarily limited thereto.

Further, the memory 790 may store information on the external force according to the movement of the internal figure, information to be used to simulate wrinkles formed by the processor 750, and simulation results.

Further, the memory 790 may store a variety of information generated in the processing process of the processor 750 described above. In addition, the memory 790 may store a variety of data and programs. The memory 790 may include a volatile memory or a non-volatile memory. The memory 790 may include a large-capacity storage medium such as a hard disk to store a variety of data.

In addition, the processor 750 may perform the at least one method described with reference to FIGS. 1 through 6 or an algorithm corresponding to the at least one method. The processor 750 may be a hardware-implemented data processing device having a circuit that is physically structured to execute desired operations. For example, the desired operations may include code or instructions included in a program. The processor 750 may be implemented as, for example, a central processing unit (CPU), a graphics processing unit (GPU), or a neural network processing unit (NPU). For example, the hardware-implemented partial simulation apparatus 700 may include, for example, a microprocessor, a central processing unit (CPU), a processor core, a multi-core processor, a multiprocessor, an application-specific integrated circuit (ASIC), and a field-programmable gate array (FPGA).

The processor 750 may execute a program and control the partial simulation apparatus 700. Program codes to be executed by the processor 750 may be stored in the memory 790.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

What is claimed is:

1. A method of simulating a garment, comprising:
receiving selection of a first region of a three-dimensional (3D) model of a garment within which wrinkles in the garment is to be simulated;
fixing three-dimensional coordinates of polygons of the 3D model in a periphery of the selected region responsive to receiving the selection;
receiving an input indicating moving of a second region of the 3D model, the second region located within the first region; and
simulating pinching to form wrinkles in a middle region within the first region but outside the second region of the garment by pulling a vertex of at least one polygon, among polygons in the middle region, in a direction of an external force generated due to the moving of the second region, responsive to receiving the input, the at least one polygon adjacent to the second region.

2. The method of claim 1, further comprising receiving a number of layers in the first region to be simulated with the wrinkles, wherein the garment in the first region includes a plurality of layers.

3. The method of claim 2, wherein the number of layers indicates a number of outermost layers to be simulated with the wrinkles.

4. The method of claim 1, wherein receiving the selection of the first region comprises:
receiving a thickness of the first region; and
determining a number of layers of the garment in the first region for simulating the wrinkles corresponding to the received thickness.

5. The method of claim 1, wherein the fixing the three-dimensional coordinates of the polygons comprises:
identifying polygons of the 3D model at the periphery of the first region; and fixing coordinates of the identified polygons relative to coordinates of polygons of the 3D model adjacent to and outside the first region.

6. The method of claim 1, wherein the input indicating the moving of the second region is a drag operation performed by a user on a graphical user interface.

7. The method of claim 6, further comprising reverting to simulation without the wrinkles, responsive to releasing the drag operation.

8. The method of claim 1, wherein simulating the pinching to form the wrinkles comprises sequentially propagating force exerted by pinching to polygons neighboring the polygon outside the second region but inside the first region.

9. The method of claim 1, wherein the external force increases as moving of the second region increases, and the wrinkles extend in a direction tangential to a direction of the input.

10. The method of claim 1, wherein configurations and three-dimensional coordinates of polygons of the 3D model outside the first region remain unchanged during simulating of the pinching to form the wrinkles.

11. The method of claim 10, wherein configurations of polygons within the second region and relative positions of the polygons within the second region remain unchanged during simulating of the pinching to form the wrinkles.

12. The method of claim 1, wherein the selection of the first region is received as through a graphical user interface.

13. An apparatus for simulating garment, comprising:
a user interface device configured to receive inputs from a user;
a processor; and
memory coupled to the user and storing instructions, the instructions when executed by the processor cause the processor to:
receive, via the user interface device, selection of a first region of a three-dimensional (3D) model of a garment within which wrinkles in the garment is to be simulated,
fix three-dimensional coordinates of polygons of the 3D model in a periphery of the selected region responsive to receiving the selection,
receive, via the user interface device, an input indicating moving of a second region of the 3D model, the second region located within the first region, and
simulate pinching to form wrinkles in a middle region within the first region but outside the second region of the garment by pulling a vertex of at least one polygon, among polygons in the middle region, in a direction of an external force generated due to the moving of the second region, responsive to receiving the input, the at least one polygon adjacent to the second region; and
a display device configured to display the wrinkles on the garment.

14. A non-transitory computer-readable storage medium storing instructions that, when executed by a processor, cause the processor to:
receive selection of a first region of a three-dimensional (3D) model of a garment within which wrinkles in the garment is to be simulated;
fix three-dimensional coordinates of polygons of the 3D model in a periphery of the selected region responsive to receiving the selection;
receive an input indicating moving of a second region of the 3D model, the second region located within the first region; and
simulate pinching to form of wrinkles in a middle region within the first region but outside the second region of the garment by pulling a vertex of at least one polygon, among polygons in the middle region, in a direction of an external force generated due to the moving of the second region, responsive to receiving the input, the at least one polygon adjacent to the second region.

15. The non-transitory computer-readable storage medium of claim 14, wherein configurations and three-dimensional coordinates of polygons of the 3D model outside the first region remain unchanged during simulating of the pinching to form the wrinkles, and wherein configurations of polygons within the second region and relative positions of the polygons within the second region remain unchanged during simulating of the pinching to form the wrinkles.

16. The non-transitory computer-readable storage medium of claim 14, wherein the instructions further cause the processor to:
receive a number of layers in the first region to be simulated with the wrinkles, wherein the garment in the first region includes a plurality of layers.

17. The non-transitory computer-readable storage medium of claim 14, wherein instructions to fix the three-dimensional coordinates of the polygons causes polygons of the 3D model at the periphery of the first region to be identified, and causes coordinates of the identified polygons to be fixed relative to coordinates of polygons of the 3D model adjacent to and outside the first region.

18. The non-transitory computer-readable storage medium of claim 14, wherein instructions to simulate the pinching to form the wrinkles comprises instructions to:
sequentially propagate force exerted by pinching to polygons neighboring the polygon outside the second region but inside the first region.

* * * * *